(12) United States Patent
McDowell et al.

(10) Patent No.: US 6,878,280 B2
(45) Date of Patent: Apr. 12, 2005

(54) WASTEWATER CLARIFICATION METHODS AND APPARATUS

(75) Inventors: Curtis S. McDowell, Allentown, PA (US); Chris Hannum, Oley, PA (US); Robert Maurer, Shillington, PA (US)

(73) Assignee: Brentwood Industries, Inc., Reading, PA (US)

( * ) Notice: Subject to any disclaimer, the term of this patent is extended or adjusted under 35 U.S.C. 154(b) by 161 days.

(21) Appl. No.: 10/414,974

(22) Filed: Apr. 16, 2003

(65) Prior Publication Data

US 2003/0192827 A1 Oct. 16, 2003

Related U.S. Application Data

(60) Provisional application No. 60/372,856, filed on Apr. 16, 2002.

(51) Int. Cl.$^7$ .................................................. C02F 3/00
(52) U.S. Cl. ...................... 210/614; 210/800; 210/803; 210/197; 210/97; 210/513; 210/103; 210/740; 210/745; 210/143; 210/528
(58) Field of Search .......................... 210/197, 97, 513, 210/103, 740, 745, 143, 528, 614, 800, 803

(56) References Cited

U.S. PATENT DOCUMENTS

| 3,953,327 A | | 4/1976 | Parker |
| 4,859,327 A | * | 8/1989 | Cox et al. .................... 210/219 |
| 5,000,859 A | * | 3/1991 | Suciu et al. ................. 210/713 |
| 5,647,986 A | * | 7/1997 | Nawathe et al. ............ 210/608 |

* cited by examiner

Primary Examiner—Chester T. Barry
(74) Attorney, Agent, or Firm—Akin, Gump, Strauss, Hauer & Feld, LLP (57) ABSTRACT

The invention relates to a liquid clarifier useful for removing solids suspended in a wastewater stream. Settled biological solids are taken from the clarifier and combined in a mixing chamber with a wastewater stream. The combined liquid is provided to a settling region of the clarifier, and suspended solids settle in a biological solids collection region, from which the solids are taken. Clarified liquid can be withdrawn or permitted to overflow from an outlet region in the settling region of the clarifier. The clarifier can enhance the degree of solids removal from wastewater streams having relatively low total suspended solids values, such as outlet streams from fixed film-type digesters. The clarifier is suitable for use in combination with other components of wastewater treatment systems, and can be included as a module in many kinds of wastewater treatment systems.

37 Claims, 5 Drawing Sheets

WASTEWATER CLARIFICATION METHODS AND APPARATUS

CROSS-REFERENCE TO RELATED APPLICATIONS

This application claims benefit of U.S. Provisional Patent Application No. 60/372,856, "Wastewater Clarification Methods and Apparatus", filed Apr. 16, 2002, the subject matter of which is incorporated herein by reference.

BACKGROUND OF THE INVENTION

The invention relates to treatment of wastewater from residential, business, industrial, or other sources.

Wastewaters obtained from various sources can contain bulk solid materials (sticks, rags, sand, and other materials that can be screened or filtered therefrom), smaller suspended solid materials that cannot be easily removed by screening or filtration, degradable organic compounds (sometimes designated biological oxygen demand or "BOD"), pathogenic microorganisms (e.g., bacteria, viruses, spores, cysts, and protists), and undesirable nutrients (e.g., nitrogen- or phosphorous-containing compounds that can encourage nuisance growth of algae or weeds at the wastewater discharge site). Discharge of these materials into the environment with the wastewater can have undesirable health and environmental consequences. As a result, wastewater discharges are closely regulated by state and national governments.

Many methods exist for removing undesirable components from wastewater prior to its discharge. Typically, a wastewater treatment method might include one or more treatment steps in which settleable and floatable solids materials are removed, one or more (aerobic and/or anaerobic) microbial degradation steps in which most suspended solids and BOD are removed or captured in biological solids or slimes produced in the degradation step, and one or more further treatment steps in which wastewater is clarified, disinfected, or further purified.

Clarifiers are devices that are used to remove suspended solids (including biological solids) from wastewater streams. In a clarifier, solids are allowed to settle from a wastewater stream by maintaining wastewater substantially still in a vessel, so that denser solids can separate by the action of gravity from less dense liquids. Clarifiers (usually designated "primary" clarifiers) are often used at an early phase of wastewater treatment to remove relatively easily-segregated solids prior to microbial degradation (i.e., "digestion") of less easily removed solids and BOD. Clarifiers (sometimes designated "secondary clarifiers") are also used to remove microbial biomass and other solids (e.g., fine solids captured on or in biomass) from wastewater following digestion processes. Because water treated in the secondary clarifier is often discharged into the environment, the clarifying function of the secondary clarifier is generally more important than the same function of the primary clarifier.

In a conventional clarifier, wastewater is fed to a central region of a large pool. Often, the central region is physically segregated from the peripheral regions of the pool, although liquid can flow from the central region to the other regions of the pool. The physically segregated region is sometimes referred to as a stilling well, since the barrier that defines this chamber is intended to reduce transfer of kinetic energy from the wastewater flow entering the unit, in order to reduce turbulence in peripheral areas of the pool (i.e., stilling the water in the pool). The chamber is in fluid communication with the peripheral areas of the pool (normally by way of a passage at the bottom of the stilling well) and permits gentle mixing between liquid in the pool and newly added wastewater. Solids that enter the clarifier by way of the stilling well settle to the floor of the clarifier by the action of gravity in the still liquid in the clarifier, and accumulate on the floor as sludge.

In activated sludge-based digestion processes, biological solids removed from a post-digestion processing stream (e.g., sludge removed from the bottom of a clarifier) can be recycled into the biological reactor in order to enhance the speed or efficiency of the digestion. However, biological solids are not recycled from output streams of fixed-film-type digesters (e.g., trickling filters and submerged fixed-film biological treatment units), nor is sludge collected in a clarifier downstream from a fixed-film-type digester recycled into the biological reactor.

The efficacy of prior art post-digestion wastewater clarification methods and apparatus varies, based on a number of factors. For instance, fixed-film biological reactors tend to have output streams containing relatively low concentrations of small solid particles that are more difficult to settle using conventional clarifiers than are solids derived from activated sludge-based biological reactors. As a result, post-clarification effluents from fixed-film biological reactors are often more turbid than desired, and further processing of the effluent can be required, adding to the duration and expense of the wastewater treatment.

A need remains for clarification apparatus and methods that can remove suspended solids more completely and efficiently than existing clarifiers, especially from wastewater streams having low concentrations of small solid particles. The invention disclosed herein satisfies this need, at least in part, by providing an improved clarifier and methods of using it.

BRIEF SUMMARY OF THE INVENTION

The invention relates to a wastewater clarifier comprising a vessel having an interior with a settling region above a biological solids collection region. The interior of the vessel has a mixing chamber in fluid communication with the settling region. The mixing chamber has a wastewater conduit for providing wastewater to the chamber and a recycle conduit for providing activated sludge from the biological solids collection region to the chamber. Wastewater and activated sludge provided to the chamber can be mixed prior to discharge therefrom to the interior of the vessel. Typically, the wastewater conduit is in fluid communication with a wastewater source and the recycle conduit is in fluid communication with the biological solids collection region of the vessel. The clarifier can clarify wastewaters containing relatively low levels of solids (e.g., less than 300, 700, 1200, or 1700 milligrams of solids per liter on a dry weight basis) more efficiently than prior clarifiers.

The clarifier can comprise a flow regulator (e.g., a pump or a manually- or automatically-operated valve) interposed between the biological solids collection region and either the outlet of the recycle conduit or the output of the solids disposal conduit. The flow regulator can be connected in signaling communication with a sensor (e.g., a turbidometer or a viscosity sensor) that senses solids content in the mixing chamber or the effluent from the clarifier.

The invention further relates to a wastewater treatment system comprising a primary clarifier for removing bulk solids from a wastewater stream, the primary clarifier being upstream from a biological reactor for digesting sludge in the wastewater stream, the biological reactor being upstream from the clarifier described herein for removing solids from the post-digestion wastewater stream. The system can further comprise other components, such as a sterilizing unit connected downstream from the clarifier for sterilizing the wastewater stream exiting from the clarifier or a single pump selectably connected with multiple fluid circuits for driving fluid flow between each of the primary clarifier, the biological reactor and the clarifier described herein.

The invention further relates to a method of clarifying a solids-containing wastewater. The method comprises combining, in a mixing chamber, the wastewater and biological solids obtained from a biological solids collection region of the interior of a vessel. The interiors of the chamber and the vessel are in fluid communication. Solids in the wastewater coalesce with the biological solids and settle in the vessel, thereby clarifying the wastewater in a settling region of the vessel, which region is above the biological solids collection region. The clarified wastewater can be collected by way of an effluent conduit in fluid communication with the settling region, and biological solids can be collected from the vessel by way of a solids disposal conduit in fluid communication with the biological solids collection region of the vessel.

The invention still further relates to an improvement in a method of clarifying wastewater in a clarifying apparatus comprising a vessel having an interior with a biological solids collection region and a wastewater conduit stream feeding into a mixing chamber that feeds into a settling region in the interior of the vessel above the biological solids collection region. The improvement comprises combining biological solids from the biological solids collection region with the wastewater conduit stream in the mixing chamber.

The invention yet further relates to a wastewater clarifier comprising i) a vessel having an interior including a settling region above a biological solids collection region; ii) a mixing chamber having an interior in fluid communication with the interior of the vessel; iii) a wastewater conduit in fluid communication with the interior of the chamber; and iv) a recycle conduit. The biological solids collection region can be placed in fluid communication with the interior of the mixing chamber, whereby wastewater provided by way of the wastewater conduit and biological solids provided by way of the recycle conduit can be combined in the chamber and provided to the interior of the vessel.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

DETAILED DESCRIPTION OF THE INVENTION

The invention relates to an improved method of operating a wastewater clarifier. Prior clarifiers have the drawback that they often do not exhibit sufficient clarification, particularly when the solids content of the incoming wastewater (e.g., as assessed by measuring total suspended solids, or "TSS") is relatively low. Thus, wastewater streams having TSS values less than about 1700 milligrams per liter (assessed on a dry weight basis, i.e., 1700 milligrams of dry material per liter of wastewater) often cannot be efficiently clarified using prior clarifiers, and the inefficiency of prior clarifiers is exacerbated as TSS values decrease, especially as the TSS value falls below about 1 gram per liter.

Wastewater effluent streams from wastewater sludge biological reactors that are commonly used can have TSS values of 1700 milligrams per liter or less, depending on the type of biological reactor, the solids content of the wastewater fed to the biological reactor, the temperature at which the biological reactor is operated, non-solids components of the biological reactor feed stream, and other operating parameters. By way of example, fixed-film-type digesters are commonly used in wastewater treatment systems. The TSS value for an effluent stream from a fixed-film-type digester can be in the range 50 to 1000 milligrams per liter or more, depending on the concentration of BOD in the wastewater. When such effluent streams are provided to prior clarifiers, the effluent from the clarifier often retains an undesirable turbidity, owing to insufficient efficiency of the clarifier for removing small and fine particles (i.e., the TSS value is not decreased as much as desired).

The invention is based on the discovery that the efficiency of a clarifier can be significantly improved by combining the wastewater fed to a clarifier with biological solids that settle in the clarifier (i.e., recycled biological solids). In this manner, a greater proportion of solids that are suspended in the wastewater can be removed in the clarifier, resulting in a less turbid (i.e., lower TSS, more highly clarified) effluent stream. Without being bound by any particular theory of operation, it is believed that mixing recycled settled biological solids obtained from the clarifier with wastewater fed to the clarifier increases the concentration of solids entering the clarifier, so that the frequency of particle-particle interactions among solids in the clarifier inlet and recycle streams increases and small and fine particles more readily agglomerate to form easily-settled particles.

Figure 1:
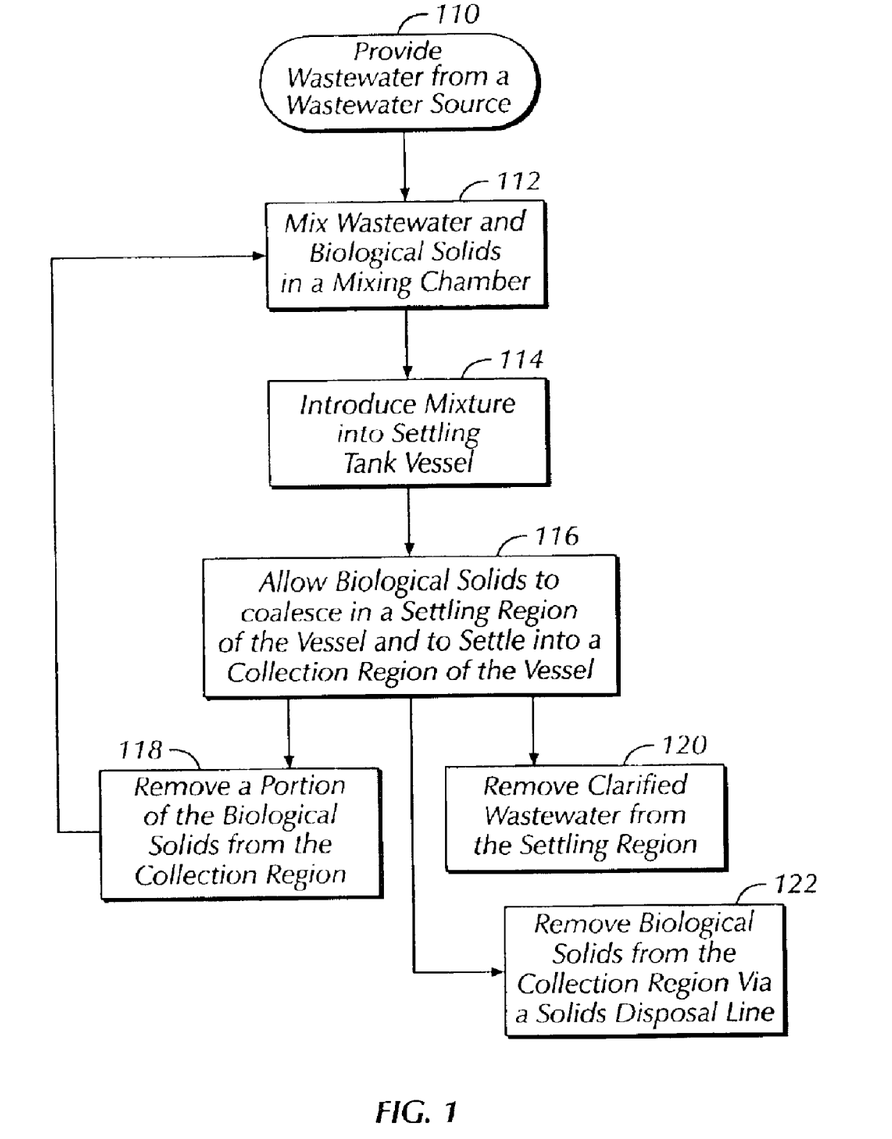
FIG. 1 is a diagram illustrating steps of a method of clarifying wastewater in accordance with the present invention.

In one embodiment, the invention relates to an improved method of operating a wastewater clarifier. As illustrated in FIG. 1, the method comprises a first step 110 of providing wastewater from a wastewater source. In a second step 112, the wastewater is delivered to a mixing chamber where the wastewater is mixed with biological solids. The mixing chamber is in fluid communication with an interior of a vessel described in detail later herein, having a settling region 13 and a biological solids collection region 15. The biological solids mixed with the wastewater in the second step 112 are removed from the collection region in a fifth step 118 described further below.

Following the second step 112 of mixing the wastewater and biological solids, the mixture is fed into the vessel as a third step 114. In a fourth step 116, the biological solids are allowed to coalesce in the settling region, and subsequently to settle into the collection region. In the fifth step 118, a portion of the biological solids settled into the collection region is extracted from the vessel, and made available for mixing with wastewater, as part of the second step 112 described above. The biological solids are removed from the collection region in a slurry form. In a sixth step 120, clarified wastewater is extracted from the settling region of the vessel. In a seventh step 122, biological solids not needed in the second step 112 via the fifth step 118 are removed from the collection region via a solids disposal conduit. The order in which the fifth, sixth and seventh steps, 118, 120 and 122, are performed is immaterial.

Without being bound by any particular theory of operation, it is believed that the improved wastewater clarifying efficiency of the clarifier described herein can be explained as follows. Biological solids that settle in clarifiers include "sticky" microbially-produced solids that are able to coalesce with "non-sticky" particles (e.g., fine suspended solids and microbially-produced materials that are not sticky, such as pin floc) with which they collide. When the concentration of the sticky microbially-produced solids in a wastewater is relatively low (e.g., corresponding to low TSS values), the probability that a suspended solid will collide and coalesce with a suspended sticky solid particle is lower than when the concentration of biological solids is higher. Thus, failure of prior clarifiers to efficiently clarify at least some wastewater streams (e.g., fixed-film-type digester effluents) may have been due to insufficiently low concentrations of biological solids in the biological reactor effluent (i.e., in the clarifier influent). By adding settled biological solids to a clarifier wastewater conduit stream, the concentration of sticky biological solids in the feed stream increases, and the likelihood of collisions between suspended solids and sticky suspended solids increases as well. Increased concentrations of these particles promotes coalescence of small and fine suspended solids into larger, settleable particles, resulting in a clearer effluent from the clarifier unit.

The method described herein can be applied by making relatively simple modifications to prior art wastewater clarifying units, or alternatively may be used with the wastewater clarifier units described in detail later herein. To illustrate use of the method with prior art wastewater clarifying units, a portion of solids removed using an existing clarifier can be added back to the feed stream of the clarifier in order to improve its performance. Such modification is beneficial if the TSS value for the feed stream is less than about 1700 milligrams per liter, more so if the value is less than about 1,000 milligrams per liter. This type of modification can also be beneficial in clarification systems in which wastewaters streams are relatively low in biological solids and relatively high in non-biological solids. Addition of recycled solids to the wastewater stream can increase the amount of flocculation-inducing material that is present in the stream, thereby improving settling or other removal of non-biological solids therefrom.

Figure 2:
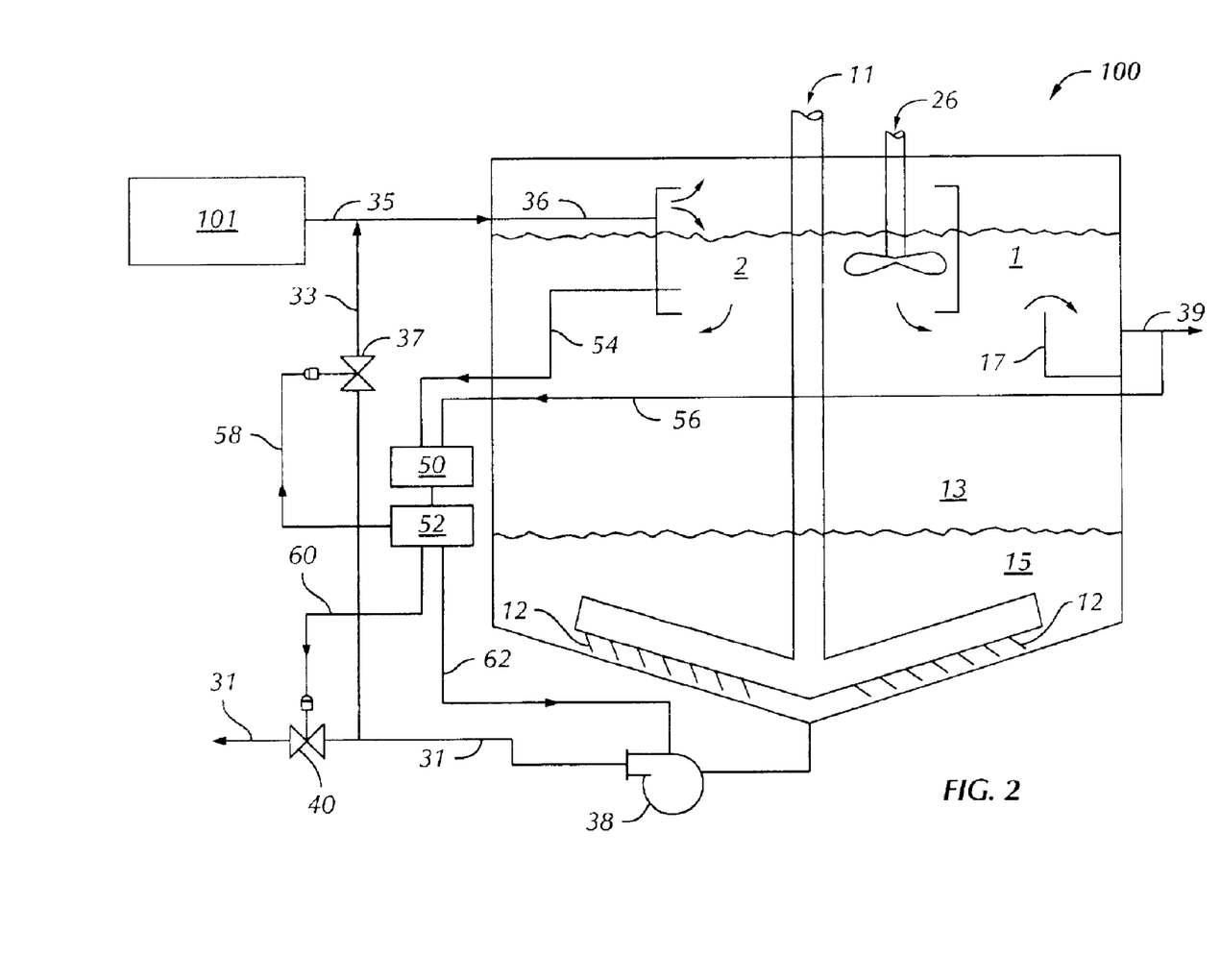
FIG. 2 is a schematic representation of one embodiment of a wastewater clarifier in accordance with the present invention.

Improved wastewater clarifiers can be designed as described herein. Referring to FIG. 2, a first embodiment of a wastewater clarifier 100 capable of being used in conjunction with the method of FIG. 1 is illustrated. The wastewater clarifier 100 comprises a vessel 1 and a mixing chamber 2. The mixing chamber 2 is in fluid communication with the vessel 1, and may be disposed within the vessel 1, maintained outside the vessel 1, or some combination of these two. The vessel 1 includes a settling region 13 and a biological solids collection region 15. A rotating rake assembly 11 extends into the collection region 15. Biological solids are removed from the vessel 1 by way of either or both of a solids disposal conduit 31 and a recycle conduit 33. Flow through the recycle conduit 33 is regulated in order to maintain an appropriate mixture with wastewater supplied from a wastewater source 101 by way of a wastewater conduit 35. Flow through the solids disposal conduit 31 is also regulated. Flow regulation in the recycle conduit 33 and the solids disposal conduit 31 may be accomplished with a flow regulator such as valves 37 and 40, a pump 38, or the combination of the pump 38 and valves 37 and 40.

In the embodiment illustrated in FIG. 2, the mixing chamber 2 has two parts, the first being a mixing conduit 36 beginning at the convergence of the wastewater conduit 35 and the recycle conduit 33. Part of the chamber 2 is disposed within the vessel 1 and is in fluid communication with the settling region 13 of the vessel 1. Suspended solids settle from the settling region 13 to the biological solids collection region 15 of the vessel 1, and clarified liquid is withdrawn from the effluent conduit 39.

In the following sections, relevant characteristics of the components of improved clarifiers are described in further detail.

The Vessel

The vessel 1 of the clarifier 100 described herein can be substantially the same as the vessel of any known clarifier. The vessel functions to contain the wastewater to be clarified, maintaining the water in a relatively still state in at least a part of the vessel (i.e., the settling region 13). Part of the vessel (i.e., the biological solids collection region 15) can be adapted to ease collection or disposal of solids that settle out of the wastewater fed to the clarifier, although this region can simply be a lower (i.e., not specially adapted) region of the vessel. Traditional clarifiers have a sloped or conical bottom, so that solids that settle in the vessel are drawn by the action of gravity to a part of the vessel at which they can be conveniently collected. Settled solids will often compact under the influence of gravity. Clarifier vessels often include a mechanical device (for example, a rake 11) to physically urge settled solids toward one or more parts of the vessel. The rake 11 sometimes has one or more flexible blades 12 attached thereto. The rake may be rotatably disposed against the bottom of the vessel, such that the blades can physically scrape a portion of the interior surface of the vessel in order to dislodge therefrom any solids that may have adhered to that surface. Wastewater clarifiers are available from numerous commercial sources, and substantially any commercially available clarifier can be modified to perform as described herein.

The material(s) from which the vessel of the clarifier is constructed is not critical. The ordinary artisan will understand that the material selected should possess sufficient strength to effectively and economically contain the wastewater to be treated in the system and that the corrosion resistance of the material should be selected to yield a practical lifetime for the clarifier, in view of the wastewater to be fed to the clarifier. Typical materials used to make clarifier vessels include plastics, concrete, stainless steel, and less corrosion-resistant materials (e.g., fiberglass or aluminum) that are coated, at least on their interior surfaces, with a corrosion-resistant material (e.g., plastic or glass).

The shape of the vessel is likewise not critical. In the first preferred embodiment of FIG. 2, the vessel 1 is cylindrical, has a conical bottom, and annularly surrounds the bottomless cylindrical mixing chamber 2 in the center of the vessel. A portion of the mixing chamber 2 is contained in a mixing conduit 36 leading to the chamber. Non-cylindrical vessels and vessels having flat, curved, or otherwise-shaped bottoms can be used. For example, the vessel can have the shape of an elongated cube (i.e., one cross-section is rectangular). In another embodiment, the vessel is a plastic cylinder with a parabolic, hemispheric, or conical bottom. The curved or conical bottom helps to concentrate settled solids in a compact region near the bottom of the vessel, to facilitate removal of the solids from the vessel.

An important characteristic of the vessel is that it should have at least two general regions when the clarifier is operating. One region, the settling region 13 of the vessel, is characterized by being above and in generally uninhibited fluid communication with a second region, the biological solids collection region 15. Although both the settling region and the biological solids collection region are characterized by substantial stillness (i.e., little or no convective fluid flow in the region) of the liquid in the region, the settling region can be less still than the biological solids collection region. In the biological solids collection region, the liquid should be substantially immobile, or at least so still that downward movement of solids attributable to density-based displacement of lighter liquid should predominate over (i.e., is at least greater than) movement of solids attributable to convectional flow of liquid in which the solids are suspended. In the mixing chamber, by contrast, it can be desirable that solids exhibit convectional movement at least in the horizontal plane (relative to gravitational pull), in order to enhance the likelihood of collisions between suspended solid particles. Limited convectional fluid flow can be induced in the mixing chamber by gentle mechanical agitation (for example, by a mixer 26), by directing liquid influx tangentially into the chamber, by exposing the top of the mixing chamber to the wind and the elements (where the mixing chamber is not contained wholly within the vessel), or otherwise.

There will generally not be a sharp delineation between the settling and biological solids collection regions of the vessel. However, a downwardly-sloped baffle can be interposed between a portion of the two regions, or vertically-oriented baffles (to inhibit convective fluid flow) can be placed in at least the biological solids collection region 15, and these baffles can enhance the differences between the two regions.

The Mixing Chamber

The mixing chamber 2 of the clarifier 100 described herein combines wastewater provided by the wastewater conduit 35 and biological solids provided from the biological solids collection region 15 of the vessel by way of the recycle conduit 33. The mixing effected by the mixing chamber enhances contact between biological solids recycled from the clarifier and solids (biological or non-biological) suspended in the wastewater. The precise arrangement, location, and construction of the mixing chamber are not critical, so long as the wastewater and biological solids recycle streams are contacted with one another. Generally, the greater degree to which the wastewater and biological solids streams are mixed (i.e., the more intimately the streams are mixed), the more efficient the removal of solids from the wastewater stream effected by the clarifier will be. However, neither extensive nor vigorous mixing is necessary. Increasing the energy put into mixing both increases the cost of the clarification, increases the likelihood of fracturing agglomerated and agglomerating solid particles, and has the potential to induce convective fluid flow in the liquid in the vessel to a greater degree than would desirable.

The mixing chamber 2 is interposed between the wastewater conduit 35 and the biological solids collection region in the interior of the vessel. The mixing chamber is in fluid communication with i) the wastewater conduit 35 from which wastewater can be provided, ii) the recycle conduit 33 from which recycled biological solids can be provided, and iii) the settling region 13 of the vessel.

Figure 3:
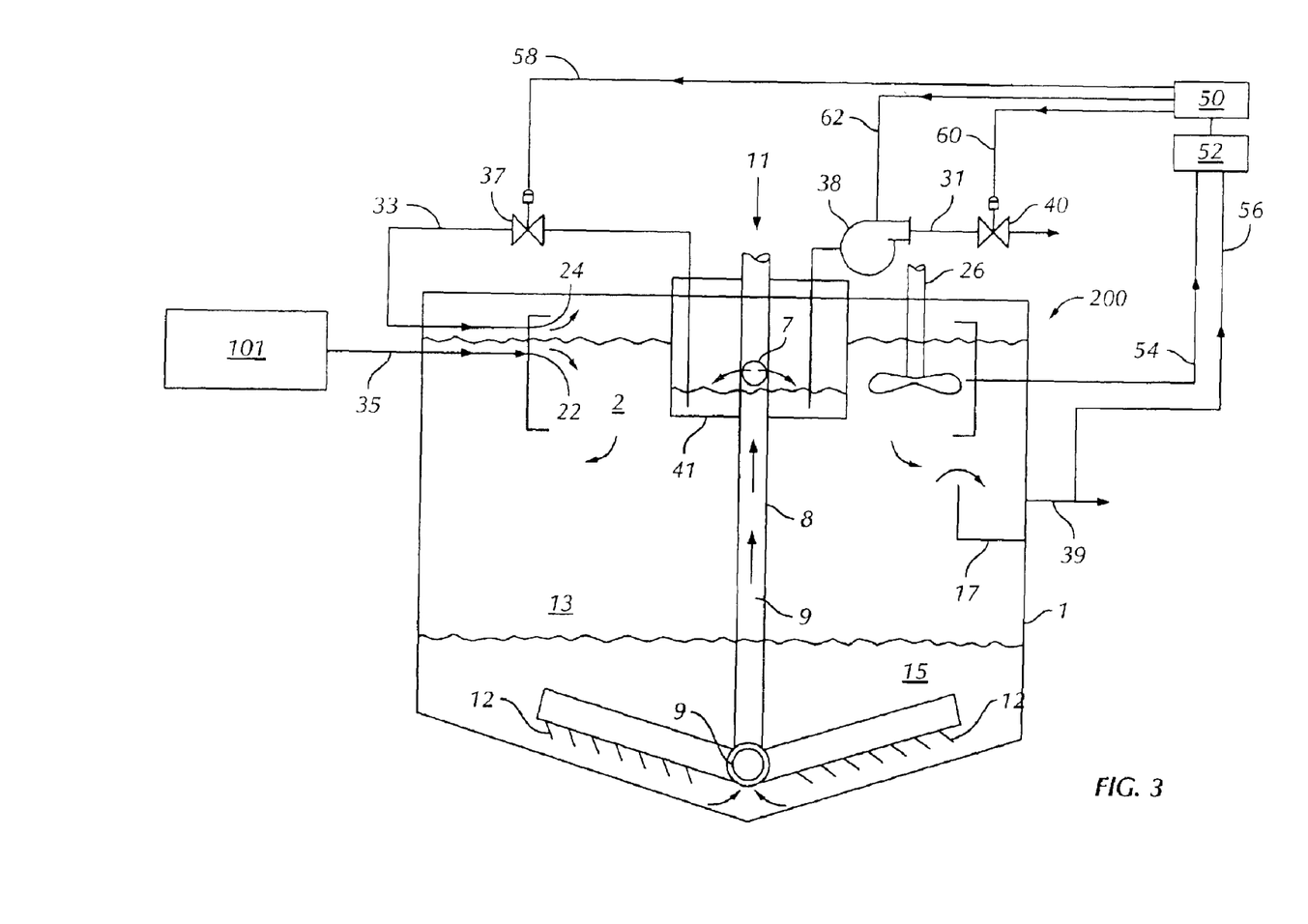
FIG. 3 is a schematic representation of a second embodiment of a wastewater clarifier in accordance with the present invention.

The mixing chamber 2 can be substantially any device in which two or more liquid flows can be combined. Mixing can be effected in an enclosed vessel having two or more inlets and a single outlet (e.g., a Y-shaped pipe junction). As illustrated in FIG. 2 and described above, the mixing chamber 2 can include the mixing conduit 36 downstream of a tee connection where the wastewater conduit 35 and the recycle conduit 33 converge. The mixing conduit 36 can have bumps, knobs, or projections in the liquid stream in order to effect mixing by convective fluid flow past the irregular surface. The mixing conduit 36 may be an enclosed pipe or may alternatively be an open trough. A static mixing device (not illustrated) can be used to effect intermixing of the liquids and any entrained solids. Mixing can likewise be effected in a vat into which two liquid flows are directed separately through individual connections. For example, FIG. 3 shows the wastewater conduit 35 connecting to the mixing chamber 2 through an inlet 22, and the recycle conduit 33 connecting to the mixing chamber 2 through an inlet 24. Optionally, the vat can have a mixer 26 therein (e.g., a slow-speed propeller-type impeller or a rotating paddle).

In the embodiment illustrated in FIG. 2, the mixing conduit 36 is located partially outside of the vessel, optionally at a distance (e.g., inches, feet, yards, or tens of yards) from the vessel. In this embodiment, mixing of wastewater and biological solids recycle slurry can be effected outside the confines of the vessel and, if desired, significant amounts of energy can be exerted to effect thorough mixing of the liquids. If significant energy is put into mixing, the mixed liquid is preferably stilled (e.g., by passage through a fluid conduit or holding tank, not illustrated) before it is provided to the settling region of the vessel.

In another embodiment, the mixing chamber is a sequestered part of the interior of the vessel, such as a partially-enclosed portion of the settling region. For example, FIG. 2 illustrates a vessel 1 that is cylindrical at its settling region 13. In the center of the upper portion of the vessel 1 is a cylindrical bottomless mixing chamber 2 to which wastewater is provided by way of a mixing conduit 36 downstream of a tee where the wastewater conduit 35 intersects a recycle conduit 33. The mixing conduit 36 may, and preferably does, act as a portion of the mixing chamber 2, mixing the wastewater and biological solids provided by way of the recycle conduit 33. Some traditional clarifying tanks have a sequestered region to which fluid flow is normally directed (in order to minimize kinetic energy transfer to bulk liquid in the clarifier). This sequestered region is acceptable as a mixing chamber in many of these traditional clarifying tanks. The mixing chamber can be wholly or partially disposed within the vessel.

The structure of the wastewater conduit and the outlet of the recycle conduit are not critical. These conduits need only facilitate fluid flow of wastewater from a supply into the mixing chamber (for the wastewater conduit) or flow of a liquid or slurry containing biological solids from the biological solids collection region of the vessel to the mixing chamber. Any standard or customized fluid fitting can be used including, for example, pipes, weirs, and corresponding fittings.

Fluid Conduits

The type, dimensions, and construction of the fluid conduits used are not critical. Of course, the type of liquids to be transmitted in the conduit, the temperature at which the clarifier will be operated, the desired lifetime of the conduit, the cost of the materials, and the transportability of the conduit can influence the design of the conduits, but these parameters represent merely normal design choices that are within the ken of the skilled engineer in view of the present disclosure.

The wastewater conduit 35 delivers wastewater from a source 101 (e.g., a raw wastewater or an effluent from another wastewater treatment apparatus) to the mixing chamber 2. The identity and structure of the wastewater conduit are not critical. However, the conduit should be constructed to accommodate anticipated liquid flows and to offer sufficient corrosion resistance to withstand the effects of the anticipated wastewater for the desired life of the conduit. The means by which wastewater is delivered through the conduit is not important. Known liquid delivery methods include centrifugal and other mechanical pumps, gravity flow, and "air lift" fluid handling methods. In an "air lift" method a gas such as air is injected into a liquid having a first hydraulic head "h". As the density of the liquid into which the gas has been injected is decreased, the hydraulic head of the liquid containing the gas is the level h plus an incremental $\Delta h$ related to the change in density. Hydraulic pressure equal to $\Delta h$ thus acts upon the liquid containing the gas. The choice of fluid convective means can depend on the specific wastewater or site characteristics, and is simply an ordinary engineering design choice made in view of the present disclosure.

In some instances no conduit will be needed for inflow of wastewater, such as when the source of the wastewater is an immediately preceding wastewater treatment process. The wastewater efflux from the preceding process can be fed directly into mixing chamber or transmitted thereto using a conduit.

The recycle conduit 33 delivers a slurry from the biological solids collection region 15 of the vessel to the mixing chamber. The slurry contains suspended biological solids, and is preferably delivered in an amount, relative to the amount and type of wastewater delivered, that the mixed wastewater and slurry has a concentration of suspended solids that is at least about 1700 milligrams per liter on a dry weight basis, and is preferably at least about 2200, 2800,or 3400 milligrams per liter or more.

The recycle conduit should be sized to accommodate anticipated liquid flow therethrough, taking into account anticipated fluctuations in wastewater inflows and in the solids content of the wastewater source. Any flow regulator in the recycle conduit should be selected to offer reproducible flow regulation in the range of anticipated liquid flow values. Typical flow rates through the recycle conduit will be about 25% up to about 200% of the wastewater inflow rate, although these values can vary with operating conditions (e.g., solids content in the recycle and inflow conduits). Typically, the recycle conduit will operate with a substantially constant flow rate (e.g., driven by an in-line pump 38 such as an air lift, centrifugal, positive displacement, or fan-type pump). However, the recycle conduit can have a manually- or automatically-operated valve 37 therein for regulating liquid flow through the conduit. The recycle conduit 33 and the solids disposal conduit 31 preferably originate at or near a portion of the vessel at which solids are collected, such as at a low point in the vessel or at a point where vessel rake blades deposit solids. As illustrated in FIG. 2, the recycle conduit 33 and the solids disposal conduit 31 can be a single conduit up to a point at which the recycle conduit 33 tees off of the solids disposal conduit 31. For example, the flow regulator can control diversion of biological solids outflow from the vessel between the recycle conduit and the solids disposal conduit. In one embodiment, the recycle conduit is wholly contained within the vessel, and extends from a sludge collection point to a location in the mixing chamber. For example, a recycle conduit having an in-line pump can draw solids from a solids-collection point in the clarifier and combine the solids with the contents of a wastewater conduit, either in the stilling well of the clarifier or in a separate mixing chamber (e.g. a static mixer) that flows into the clarifier.

The effluent conduit 39 through which clarified liquid flows as clean effluent from the vessel should be in fluid connection with the settling region of the vessel, preferably near the top of the liquid column in the settling region. In order to minimize entrainment of suspended solids in the effluent, one or more baffles 17 can be interposed between the outlet from the vessel to the effluent conduit and the biological solids collection region of the vessel. These baffles 17 are preferably arranged to inhibit circulation of liquid near the outlet in response to any bulk fluid flows in the vessel, thereby enhancing settling of suspended solids from the liquid near the outlet.

Fluid flow through the liquid conduits of the clarifier can be driven by gravity, by one or more pumps, by airlift conveyance, or by substantially any other fluid conveying means. In one embodiment, a single pump is selectably connectable to a variety of liquid circuits (e.g., a circuit from the wastewater source to the mixing vessel, a circuit from the biological solids collection region of the vessel to the mixing vessel, and a circuit from the effluent conduit to an ensuing effluent treatment apparatus) so that a single pump can be used to generate all liquid flows needed for the clarifier (or for multiple clarifiers in a wastewater treatment system, such as for both a primary clarifier and a secondary clarifier as described herein).

A flow regulator preferably is installed in one or all of the wastewater conduit, the solids disposal conduit, and the recycle conduit in order to modulate fluid flow therethrough. Because the purpose of the clarifier is often to treat whatever wastewater is delivered to the site, the flow regulator should usually be installed in at least the solids disposal conduit 31 (i.e., at or between the biological solids collection region of the vessel and the output of the solids disposal conduit). Operation of the flow regulator permits the operator to modulate the solids content of the mixed recycle slurry and wastewater, so that the solids content of that liquid has a value disclosed herein. Typically, the bulk of solids that settle in the biological solids collection region of the vessel will be recycled to the vessel, particularly when the total solids content of the vessel is relatively low (e.g., soon after starting the wastewater treatment including the clarifier or shortly after discharging solids from the clarifier). As the amount of solids contained within the vessel increases, flows through the wastewater conduit, recycle conduit and/or solids disposal conduit can be adjusted to maintain a desirable solids content in the mixing chamber of the clarifier. In one embodiment, the clarifier comprises a solids sensor 50 for sensing the solids content of liquid in the mixing chamber 2. If the solids content of that liquid is less than a selected value (e.g., less than 1700 milligrams per liter or less than 2200 milligrams per liter), then the sensor can signal a pump or valve in the recycle conduit to increase fluid flow through the recycle conduit; if the solids content of the liquid in the mixing chamber is greater than a selected value, then the sensor can signal the pump or valve to decrease flow through the recycle conduit. Likewise, flow through valve 40 disposed in the solids disposal conduit 31 could be increased when the solids content of liquid in the mixing chamber exceeds a selected value.

Flow through the solids disposal conduit can be intermittent or continuous. In one embodiment, the solids disposal conduit is closed until the level (i.e., depth) or amount of solids in the clarifier interferes with the clarity of the liquid in the effluent conduit 39. At this point, flow through the recycle conduit can be very low, owing to the relatively high solids content of the liquid in the settling region of the clarifier and, consequently, in the mixing chamber thereof. When the solids level or amount is sufficiently high, the solids disposal conduit can be opened to flush some or all of the liquid out of the clarifier. Preferably, at least some residual solids are retained in the vessel, so that those solids can be combined with the wastewater fed to the clarifier when the solids disposal conduit is once again closed. Solids content in the vessel can be monitored automatically (e.g., using a sensor), monitored by visual inspection by an operator, or estimated based on expected or historical performance of the unit. In another embodiment, an intermittent or constant flow of liquid through the solids disposal conduit can be maintained, in order to withdraw solids at approximately the rate at which solids are fed to the clarifier unit. This intermittent or constant flow can be automatically or manually-controlled.

In one embodiment, a flow regulator regulates fluid flow through the recycle conduit, through the solids disposal conduit, or both, and is connected with a sensor 50. The sensor 50 is in sensory communication with the interior of the mixing chamber or the vessel, meaning that the sensor 50 is able to detect the solids content of liquid in the mixing chamber (or, less preferably, the solids content of liquid in another portion of the interior of the vessel, such as the settling region or liquid in the effluent conduit). The type of sensor used to assess solids content is not critical. Examples of suitable sensors include turbidity sensors (e.g., sensors which assess transmission of light through the liquid) and viscosity sensors. The sensor 50 may either be remote from the mixing chamber and in signaling communication with the mixing chamber via a signal line 54, or may be disposed within the mixing chamber.

In another embodiment, the sensor 50 is in signaling communication with the effluent conduit 39 to monitor the level of solids in the effluent. If the level of solids exceeds a setpoint, a valve 40 in the solids disposal conduit 31 can be adjusted to remove solids from the solids collection region. The sensor 50 may either be remote from the effluent conduit 39, and in signaling communication with the effluent conduit 39 via signal line 56, or the sensor 50 may be disposed within the effluent conduit 39.

The sensor can be connected with a display, so as to indicate the solids content to an operator or to indicate when an adjustment to the flow regulator should be made. Alternatively, the sensor can be connecting in signaling communication with the flow regulator, meaning that the sensor transmits a signal related to the solids content of the sensed liquid to the regulator so that flow through the recycle conduit can be modulated as desired. The artisan would recognize in view of the present disclosure that substantially any known chemical process controller 52 (e.g., proportional, proportional-integral or proportional-integral-derivative [P, PI or PID] type mechanical, pneumatic, or electrical controllers) can be used to correlate signal output from the sensor with biological solids slurry flow through the recycle conduit, the solids disposal conduit, or both. Typically, a set point value (e.g., 2200 milligrams of solids per liter of liquid, on a dry weight basis) is programmed or set for the controller and signals from the sensor are compared with the set point signal. Any difference between the two signals is communicated by the controller to the flow regulator in order to modulate flow through the conduit and bring the sensed value closer to the set point value. FIG. 2 illustrates the controller 52 being in signaling communication with the valve 37, the pump 38 and the valve 40 through signal lines 58, 62 and 60, respectively.

An alternative embodiment of the clarifier is shown in FIG. 3. In this second embodiment, a wastewater clarifier 200 has a sludge well 41 preferably disposed at least partially within the vessel 1, also preferably positioned concentrically within the vessel 1 and the mixing chamber 2. The rake 11 comprises a shaft 8 that comprises a hollow portion 9. A sludge well 41 sealingly surrounds a portion of the shaft 8 and extends above the liquid level in the vessel 1, thereby substantially isolating liquid in the sludge well 41 from liquid in other portions of the vessel 1. The hollow portion 9 of the rake shaft 8 has an orifice 7 in its wall within the sludge well 41, so that the interior of the sludge well 41 is in fluid communication with the interior of the hollow portion 9. The hollow portion 9 extends near the floor or bottom of the vessel 1 and facilitates liquid flow between the lower portion of the vessel 1 and the sludge well 41. A solids disposal conduit 31, shown having an in-line centrifugal pump 38 in FIGS. 2 and 3, withdraws liquid from the sludge well 41.

The liquid level in the sludge well 41 can thereby be brought to or maintained at a lower level than the liquid level in the vessel 1. Because the liquid in the vessel 1 communicates with the liquid in the sludge well 41 by way of the hollow portion 9 of the rake shaft 8 by way of the orifice 7 therein, the difference in liquid levels generates hydraulic pressure that urges liquid upwardly in the hollow portion 9 of the rake shaft 8, through the orifice 7, and into the sludge well 41. Because this liquid enters the hollow portion 9 near the lower interior surface of the vessel 1, sludge or other solids can be entrained in the liquid and transported therewith to the sludge well 41. Alternatively, liquid flow through the hollow portion 9 can be driven by air lift, using a sparger or gas inlet positioned below or within the hollow portion 9.

Once in the sludge well 41, solids can be removed manually or by way of the solids disposal conduit 31, or they can be added to the mixing chamber 2 by way of a recycle conduit 33. Fluid flow in the recycle conduit 33 can be driven by a pump. Preferably, however, fluid flow through the recycle conduit 33 is driven by hydraulic lift or "air lift", whereby a gas such as air is injected into a lower portion of the recycle conduit 33. As described above, the presence of gas bubbles lowers the density of the liquid in the conduit. So long as the lower portion of the recycle conduit 33 is below the level of liquid in the sludge well 41, hydraulic pressure will drive liquid flow through the conduit. The outlet of the recycle conduit 33 is preferably placed in fluid communication with the mixing chamber 2, so that solids in the recycled liquid will mix with wastewater being supplied to the chamber 2.

Figure 4:
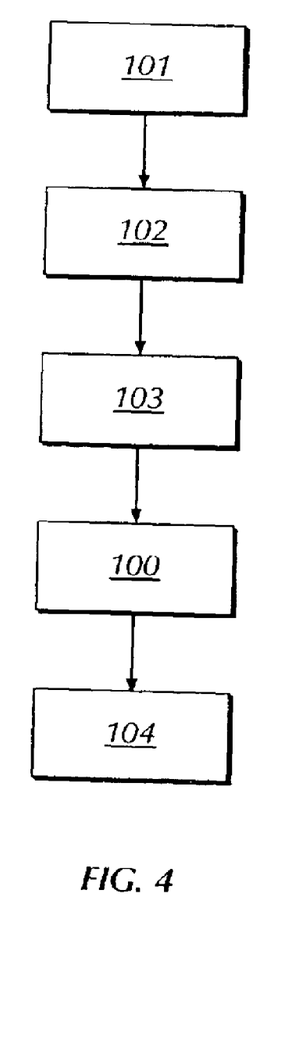
FIG. 4 is a diagram illustrating an arrangement of elements in a wastewater treatment system including the wastewater clarifier in accordance with the present invention.

The clarifier described herein can be used as a stand-alone unit. However, it is contemplated that the clarifier will often be used as a module in a multi-step wastewater treatment system, such as that illustrated in FIG. 4. FIG. 4 shows a wastewater treatment system comprising in sequence the elements of the wastewater source 101, a primary clarifier 102, a biological reactor 103, the clarifying unit 100 and a sterilizer 104. The biological reactor 103 is preferably a fixed-film type digester.

Figure 5A:
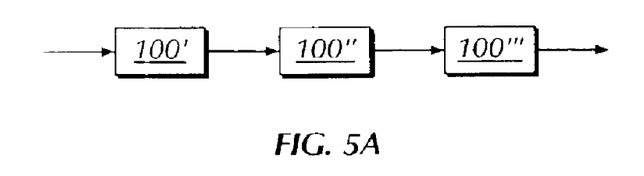
FIGS. 5A, 5B, and 5C are diagrams that illustrate suitable arrangements of multiple wastewater clarifiers in accordance with the present invention.
Figure 5B:
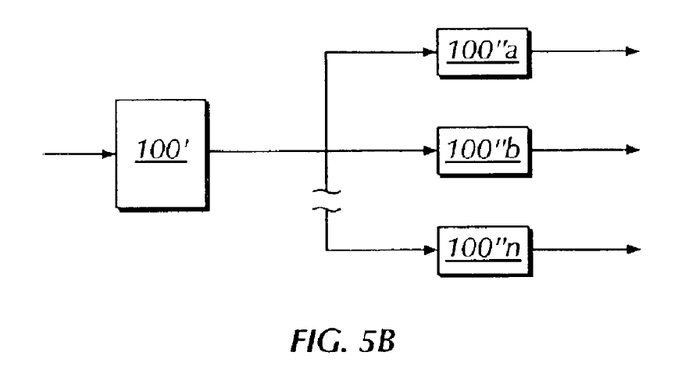
Figure 5C:
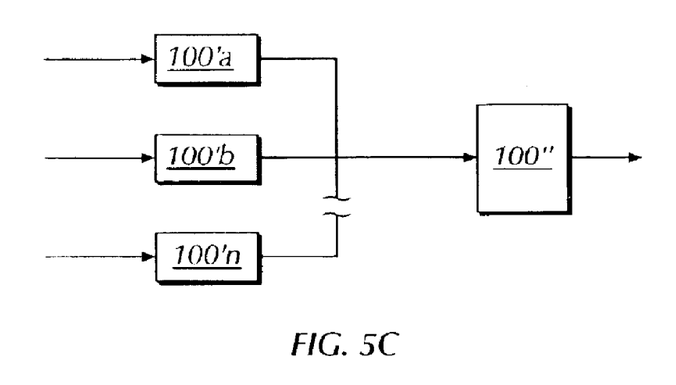

Furthermore, it is contemplated that multiple clarifier units can be used in series or in parallel in a variety of configurations (e.g., configurations as illustrated in FIG. 5). FIG. 5A illustrates a first stage clarifier unit 100' in series with a second stage clarifier unit 100'' in series with a third stage clarifier unit 100'''. FIG. 5B illustrates a single first stage clarifier unit 100' in series with a plurality of second stage clarifier units 100''$a$, 100''$b$ and 100''$n$, where 100''$n$ represents an arbitrary $n^{th}$ unit, all of the second stage clarifier units being connected in parallel with one another. FIG. 5C illustrates a plurality of first stage clarifier units 100'$a$, 100'$b$, . . . 100'$n$ connected in parallel with one another and further connected in series with a single second stage clarifier unit 100''. From this disclosure the artisan would recognize that the clarifier unit 100 may be combined in an endless variety of multi-stage series and/or parallel configurations.

When the clarifier is used as a part of a multi-stage wastewater treatment process, fluid flow between the stages of the process can be effected in any known manner in view of the present disclosure. In a preferred embodiment, a single pump is selectably connectable with a variety of valved liquid circuits that interconnect the stages of the process, so that a single pump can provide all liquid flows needed in the process.

The disclosure of every patent, patent application, and publication cited herein is incorporated herein by reference in its entirety.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A wastewater clarifier comprising a vessel having an interior with a settling region above a biological solids collection region, the interior of the vessel having a mixing chamber in fluid communication with the settling region, the wastewater clarifier further including a wastewater conduit for providing wastewater to the chamber and a recycle conduit for providing activated sludge from the biological solids collection region to the chamber, whereby wastewater and activated sludge provided to the chamber can be mixed prior to discharge therefrom to the interior of the vessel.

2. The clarifier of claim 1, wherein the wastewater conduit is in fluid communication with a wastewater source and the recycle conduit is in fluid communication with the biological solids collection region.

3. The clarifier of claim 2, wherein wastewater from the wastewater source contains less than about 1700 milligrams of solids per liter on a dry weight basis.

4. The clarifier of claim 2, wherein a flow regulator is interposed between the biological solids collection region and an outlet of the recycle conduit.

5. The clarifier of claim 4, wherein the regulator is a pump.

6. The clarifier of claim 4, wherein the regulator is a valve.

7. The clarifier of claim 4, wherein the regulator is set such that a mixture formed by combining wastewater from the wastewater source in the chamber with biological solids from the biological solids collection region contains not less than about 1700 milligrams of solids per liter on a dry weight basis.

8. The clarifier of claim 7, further comprising a suspended solids sensor in sensory communication with the interior of the chamber and in signaling communication with the regulator, whereby the sensor assesses a solids content of liquid in the mixing chamber and transmits a signal to the regulator in order to maintain the solids content of liquid in the chamber at a level not less than about 1700 milligrams of solids per liter on a dry weight basis.

9. The clarifier of claim 8, wherein the sensor is a turbidity sensor.

10. The clarifier of claim 8, wherein the sensor is a viscosity sensor.

11. The clarifier of claim 2, wherein a flow regulator is interposed between the biological solids collection region and an outlet of a solids disposal conduit in fluid communication with the biological solids collection region.

12. The clarifier of claim 11, wherein the regulator is a valve.

13. The clarifier of claim 11, wherein the regulator is set to allow flow through the solids disposal conduit when a solids content of liquid in the mixing chamber exceeds a selected value.

14. The clarifier of claim 11, wherein the regulator is set to allow flow through the solids disposal conduit when a solids content of liquid in the effluent conduit exceeds a selected value.

15. The clarifier of claim 14, wherein the sensor is a turbidity sensor.

16. The clarifier of claim 14, wherein the sensor is a viscosity sensor.

17. The clarifier of claim 2, wherein wastewater from the wastewater source contains less than about 1 gram of solids per liter on a dry weight basis.

18. The clarifier of claim 1, wherein the chamber is disposed within the vessel.

19. The clarifier of claim 18, wherein the chamber and the vessel each has a substantially circular horizontal cross section, relative to the direction of gravitational pull, and wherein the vessel is situated substantially annularly around the chamber.

20. The clarifier of claim 18, wherein a mixer is disposed within the chamber, whereby liquid in the chamber is mixed with liquid drawn from the settling region of the vessel.

21. The clarifier of claim 20, wherein the mixer is selected from the group consisting of a propeller-type impeller and a rotating paddle.

22. The clarifier of claim 20, wherein the mixer is operated such that it does not substantially mix liquid in the biological solids collection region with liquid in the settling region.

23. The clarifier of claim 1, further comprising a solids disposal conduit in fluid communication with the biological solids collection region.

24. The clarifier of claim 23, wherein the solids disposal conduit is divertable into the recycle conduit of the chamber.

25. The clarifier of claim 23, further comprising a rake movably disposed along a bottom of the vessel for directing settled biological solids to the solids disposal conduit.

26. The clarifier of claim 25, wherein the rake is rotatably disposed against the bottom of the vessel and comprises a plurality of flexible blades extending from the rake against the vessel for scraping biological solids from the vessel.

27. The clarifier of claim 1, further comprising an effluent conduit in fluid communication with the settling region of the vessel for withdrawing clarified liquid from the vessel.

28. The clarifier of claim 27, further comprising a baffle in the settling region, interposed between the effluent conduit and the biological solids collection region for inhibiting flow of suspended solids into the effluent conduit.

29. A wastewater treatment system comprising a primary clarifier for removing bulk solids from a wastewater stream, the primary clarifier being upstream from a biological reactor for digesting organic material in the wastewater stream, the reactor being upstream from the clarifier of claim 1 for removing solids from the post-digestion waste water stream.

30. The system of claim 29, further comprising a sterilizing unit connected downstream from the clarifier for sterilizing the wastewater stream exiting from the clarifier.

31. The system of claim 29, wherein the biological reactor is a fixed-film-type digester.

32. The system of claim 29, wherein a single pump selectably connected with multiple fluid circuits drives fluid flow between each of the primary clarifier, the biological reactor and the clarifier of claim 27.

33. A method of clarifying solids-containing wastewater, the method comprising the steps of:

providing solids-containing wastewater from a wastewater source, and combining, in a mixing chamber having an interior, the wastewater and biological solids obtained from a biological solids collection region of an interior of a vessel, wherein the interiors of the chamber and the vessel are in fluid communication, whereby solids in the wastewater coalesce with the biological solids and settle in the vessel, thereby clarifying the wastewater in a settling region of the vessel, wherein the settling region is above the biological solids collection region.

34. The method of claim 33, wherein clarified wastewater is collected by way of an effluent conduit in fluid communication with the settling region.

35. The method of claim 33, wherein the biological solids are collected from the vessel by way of a solids disposal conduit in fluid communication with the biological solids collection region of the vessel.

36. An improvement of a method of clarifying wastewater in a clarifying apparatus comprising a vessel having an interior with a biological solids collection region and a wastewater conduit stream feeding into a mixing chamber that feeds into a settling region in the interior of the vessel above the biological solids collection region, the improvement comprising combining biological solids from the biological solids collection region with the wastewater conduit stream in the mixing chamber.

37. A wastewater clarifier comprising i) a vessel having an interior including a settling region above a biological solids collection region;

ii) a mixing chamber having an interior in fluid communication with the interior of the vessel;

iii) a wastewater conduit in fluid communication with the interior of the chamber; and iv) a recycle conduit whereby the biological solids collection region can be placed in fluid communication with the interior of the mixing chamber;

whereby wastewater provided by way of the wastewater conduit and biological solids provided by way of the recycle conduit can be combined in the chamber and provided to the interior of the vessel.

* * * * *